July 30, 1929.                    O. THOMPSON                    1,722,642
                                 MAGNETIC SWITCH
                              Filed April 13, 1926              2 Sheets-Sheet 1

Olof Thompson  INVENTOR.
BY
Gifford & Scull  ATTORNEYS.

July 30, 1929.　　　　O. THOMPSON　　　　1,722,642
MAGNETIC SWITCH
Filed April 13, 1926　　　　2 Sheets-Sheet 2

Olof Thompson INVENTOR.

BY

Gifford & Scull ATTORNEYS.

Patented July 30, 1929.

1,722,642

UNITED STATES PATENT OFFICE.

OLOF THOMPSON, OF NEW YORK, N. Y., ASSIGNOR TO TAKAMINE CORPORATION, OF LONG ISLAND CITY, NEW YORK, A CORPORATION OF NEW YORK.

MAGNETIC SWITCH.

Application filed April 13, 1926. Serial No. 101,630.

This invention relates to a magnetically-operated electric switch. It relates more particularly to a switch of this type in which the switch is closed by energization of a magnet and is mechanically retained in the closed position until the magnet is again energized. In switches of this character, objections sometimes arise because the push button or the switch by which the circuit is closed to energize the magnet is inadvertently closed again after the intended closure to energize the magnet, thereby again inadvertently energizing the magnet and either closing the main line switch when it is intended to open the same or opening the main line switch when it is intended to close the same.

By the present invention, this objection is overcome and an electric switch to be operated by a single magnet is provided, in which two separate push buttons or auxiliary switches are used, one for energizing the magnet to close the main line switch and the other for energizing the magnet to open the main line switch. At the same time, provision is made by which closing of the main line switch opens a contact in the circuit through the magnet which closes the main line switch, thus making it impossible to energize the magnet through the auxiliary magnet closing switch, while the main switch is closed, and provision is also made by which a similar operation takes place when the main line switch is open. That is, when the main line switch has been closed by energization of the magnet, the magnet can then be again energized only by closing the circuit through the magnet by means of the auxiliary switch which opens the main line switch and vice versa. Other features and advantages of the invention will be obvious as the description proceeds, and it is to be understood that modifications may be made therein without departing from the spirit or scope of the invention.

Figure 1:
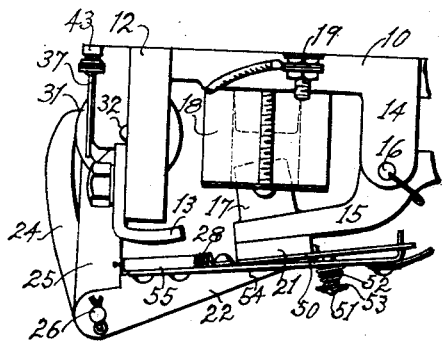
Figure 2:
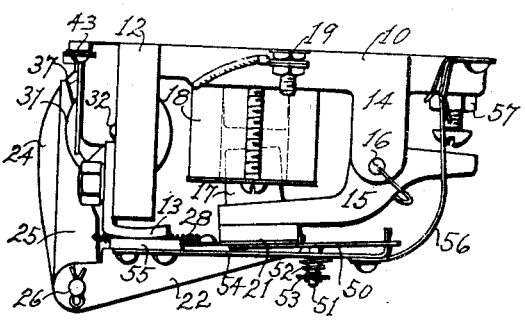
Figure 3:
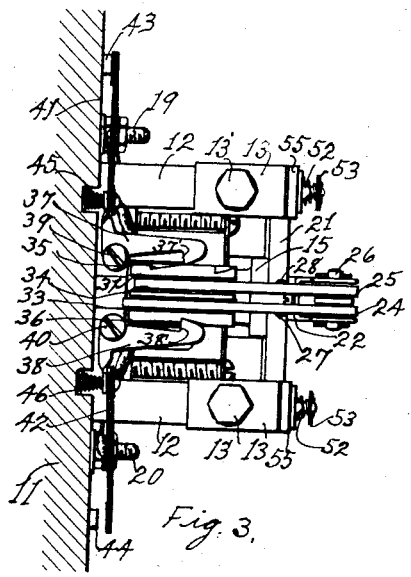
Figure 4:
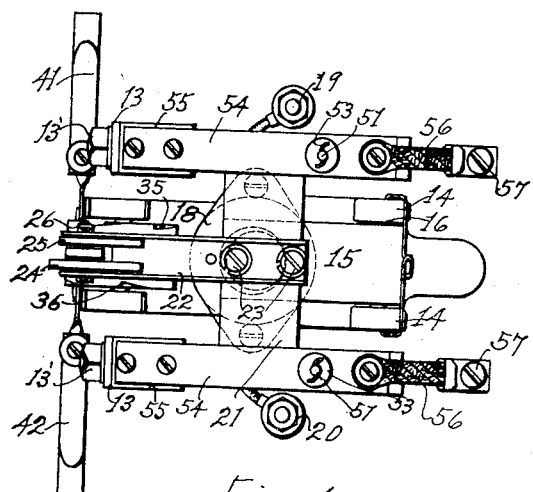
Figure 5:
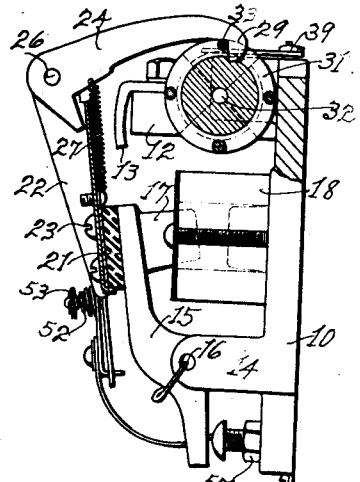
Figure 6:
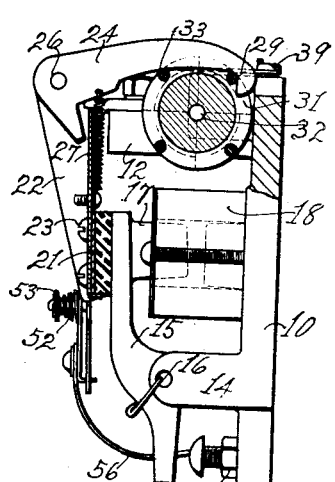
Figure 7:
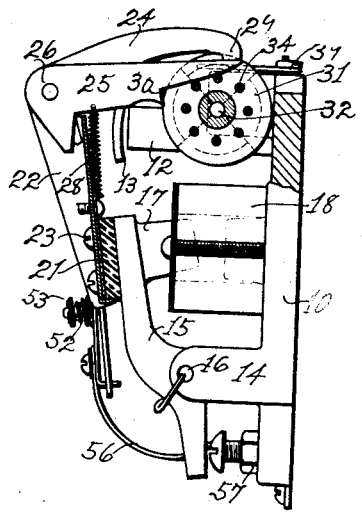
Figure 8:
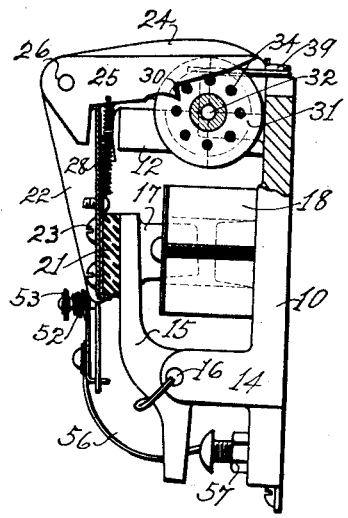

The invention will be understood from the description in connection with the accompanying drawings, in which Fig. 1 is a side view of the switch in open position; in which 2 is a similar view in closed position; Fig. 3 is an end view of the switch; Fig. 4 is a plan view of the same; Fig. 5 is a side view, partly in section, in the open position of the switch; Fig. 6 is a similar view in the closed position; Fig. 7 is a view similar to Fig. 5, the section being taken along the different plane and Fig. 8 is a view similar to Fig. 6, the section being taken along the same plane as that in Fig. 7.

In the drawings, reference character 10 represents the base of the switch that may be attached to a support 11 (Fig. 3). Contact posts 12 are provided upon which contacts 13 are mounted. The base 10 is also provided with lugs 14 between which the armature 15 is pivoted upon the pin 16. A lug 17 on the armature 15 extends into a magnet 18, the winding of which is provided with terminals 19 and 20. A cross piece 21 of insulated material is attached to the armature 15 on the side opposite the lug 17, and a pawl carrier 22 is attached to the cross piece 21 near its middle portion by means of screws 23. The pawl carrier has pawls 24 and 25 pivoted at its upper end on a cross pin 26, and tension springs 27 and 28 are attached to the pawls 24 and 25 and to the pawl carrier, so as to tend to turn the pawls clockwise as seen in the Figures. The pawl 24 is provided with a hook 29 near its end, and the pawl 25 is provided with a shoulder 30 intermediate its ends.

A wheel 31 is pivoted below the ends of the pawls on a shaft 32, and is provided with circumferential grooves. Cross pins 33 and 34 are mounted in the wheel 31 to serve as teeth for a purpose to be described below. This wheel is made up of outer discs $31_1$ and $31_2$ and an intermediate disc $31_3$. The outer discs are provided with recesses 35 and 36 on the sides thereof, these recesses being so shaped as to form straight shoulders at one end thereof and are adapted to permit pawls to catch in these recesses. Bell-crank shaped pawls 37 and 38 provided with hooks 37' and 38' to drop into the recesses 35 and 36 are pivoted at 39 and 40, respectively, and one arm of each carries contact members 41 and 42, respectively, that are adapted to make contact with the contacts 43 and 44. Compression springs 45 and 46 between the pawls and the support 11 tend to turn the pawls so that their hooks 37' and 38' drop into the recesses in the sides of the wheel 31.

Connecting members 50 are attached to the respective ends of the cross piece 21 of insulating material and are provided with pins 51 that project through contact carriers. These pins are surrounded by compression springs 52 that are interposed between the washers 53 held by cross pins near the outer ends of the pins 51 and the contact carriers 54. The contact carriers 54 are provided with contacts 55 and are connected by means of connecting wires or bands 56 to the binding posts 57.

As an illustrative example showing a particular use of this switch, it may be mentioned that by means of the binding posts 13' and 57, the switch can be used as a double pole switch between a source of electricity and a load, such as a heater, motor, etc. The contact 43 may be connected in a circuit in series with a push button, this circuit including the coil of the magnet 18. Similarly, the contact 44 may be located in a circuit in series with a separate push button, which circuit also includes the coil of the magnet 18.

The operation is as follows: Assuming that the switch is open, as shown in Fig. 1, and the contact 43 is closed, the magnet 18 may be energized by closing the push button that is in series with the contact 43, whereupon the magnet is energized, and the armature 15 is drawn inwardly carrying the pawls 24 and 25. The shoulder 30 of the pawl 25 (Figs. 7 and 8) comes into contact with one of the pins 34 and turns the wheel 31 from the position shown in Fig. 5 to that shown in Fig. 6, whereupon the hook 37' of the pawl 37 drops into the succeeding recess 35 in the side of the wheel 31 and prevents this wheel from being turned backwards. This causes the pin 33 behind the hook 29 on the pawl 24 to retain this pawl in the position shown in Fig. 6, thus maintaining the armature 15 in the closing position, so that the contacts 13 and 55 are held closed with the compression springs 52 slightly compressed. At the same time, the movement of the pawl 37 to seat its hook 37' into the recess 35 moves the contact member 41 away from the contact 43, thus opening the circuit through the magnet 18, which circuit includes the push button for closing the main line switch. Therefore, successive closures of such a push button will not again energize the magnet while the main line circuit is closed.

When it is desired to open the main line circuit, the push button that is in series with the contact 44 is closed and the magnet 18 is again energized as the contact 44 is closed, while the main line switch is closed, due to the fact that the pawl 38 has been turned so that its hook 38' is no longer in a recess 36 and the contact 44 is closed. This energization of the magnet will again cause the pawl 25 to turn the wheel 31, causing a succeeding pin 33 bearing against the lower side of the pawl 24 to lift the hook 29 of this pawl from behind a preceding pin 33 preparatory to moving to the open switch position. The advance of the wheel 31 by means of the pawl 25 causes the hook of the pawl 37' to ride along the sloping side of the recess and thus close the contact 43, while at the same time, the hook 38' of the pawl 38 drops into a recess 36 on the other side of the wheel 31, thus opening the magnet circuit at the contact 44. As soon as the magnet 18 is deenergized, the armature 15 turns anticlockwise as seen in Figs. 5 and 6, thus separating the main line contacts 13 and 15 and opening the main line circuit and rendering it impossible to again close this main line circuit by inadvertent closing of the push button that is in series with the contact 44, as this contact will remain open as long as the main line switch is open.

It will be observed that there are twice as many of the pins 34 as there are of the pins 33 in the wheel 31, and that the recesses 35 and 36 on the sides of the wheel 31 are staggered with respect to each other, so that successive energizations of the magnet 18 or operations of the armature 15 will cause the pawls 37 and 38 to be operated alternately, thus opening the contacts 43 and 44 alternately, and also causing the hook 29 of the pawl 24 to keep the main line switch closed and to permit it to be opened, respectively by successive energizations of the magnet 18.

I claim:

1. An electric switch comprising a single armature and a magnet, a plurality of independent pawls operated by said armature, and means operated by one of said pawls to catch and release the other pawl alternately 2. An electric switch comprising an armature and a magnet, a plurality of independent pawls operated by said armature, and means comprising a revoluble wheel having two series of pawl engaging elements operated by one of said pawls to catch and release the other pawl alternately.

3. An electric switch comprising an armature and a magnet, pawls operated by said armature, and means comprising a revoluble wheel having two series of pawl engaging elements with twice as many elements in one series as in the other, operated by one of said pawls to catch and release the other pawl alternately.

4. An electric switch comprising an armature and a magnet, a plurality of independent pawls operated by said armature, means operated by one of said pawls to catch and release the other pawl alternately, and pivoted pawls operated by said means.

5. An electric switch comprising an armature and a magnet, pawls operated by said armature, means operated by one of said pawls to catch and release the other pawl alternately, pivoted pawls operated by said means, and contacts closed by said last named pawls.

6. An electric switch comprising an armature and a magnet, pawls operated by said armature, means comprising a revoluble wheel operated by one of said pawls to catch and release the other pawl alternately, pivoted pawls operated by said means, said pivoted pawls preventing said wheel from revolving in one direction.

7. An electric switch comprising an armature and a magnet, pawls operated by said armature, means comprising a revoluble wheel operated by one of said pawls to catch and release the other pawl alternately, pivoted pawls operated by said means, said pivoted pawls preventing said wheel from revolving in one direction, and contacts closed alternately by said pivoted pawls.

8. An electric switch comprising an armature and a magnet, pawls carried by said armature, a revoluble member carrying two series of pawl engaging elements, one of said series having more pawl engaging elements than the other, recesses in the sides of said revoluble member, and pivoted pawls engaging alternately in said recesses.

OLOF THOMPSON.